United States Patent
Ha et al.

(10) Patent No.: US 11,303,140 B2
(45) Date of Patent: Apr. 12, 2022

(54) METHOD FOR PREVENTING OVERCHARGING OF BATTERY AND ELECTRONIC DEVICE THEREFOR

(71) Applicant: Samsung Electronics Co., Ltd., Gyeonggi-do (KR)

(72) Inventors: Youngmi Ha, Gyeonggi-do (KR); Jaemu Ha, Gyeonggi-do (KR); Hansol Choi, Gyeonggi-do (KR); Byungwook Kim, Gyeonggi-do (KR); Kwanbae Son, Gyeonggi-do (KR); Sungjoon Cho, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 243 days.

(21) Appl. No.: 16/495,942

(22) PCT Filed: Feb. 21, 2018

(86) PCT No.: PCT/KR2018/002087
§ 371 (c)(1),
(2) Date: Sep. 20, 2019

(87) PCT Pub. No.: WO2018/182176
PCT Pub. Date: Oct. 4, 2018

(65) Prior Publication Data
US 2020/0144842 A1    May 7, 2020

(30) Foreign Application Priority Data
Mar. 29, 2017   (KR) .................... 10-2017-0039874

(51) Int. Cl.
*H02J 7/00* (2006.01)

(52) U.S. Cl.
CPC ........ *H02J 7/00302* (2020.01); *H02J 7/0047* (2013.01); *H02J 7/0071* (2020.01)

(58) Field of Classification Search
CPC ..... H02J 7/00302; H02J 7/0047; H02J 7/0071
(Continued)

(56) References Cited

U.S. PATENT DOCUMENTS

| 2005/0134225 A1* | 6/2005 | Mese ............... H02J 7/0071 320/132 |
| 2012/0062181 A1* | 3/2012 | Lee ............... H02J 7/342 320/138 |

(Continued)

FOREIGN PATENT DOCUMENTS

| JP | 7-123602 A | 5/1995 |
| KR | 1998-073384 A | 11/1998 |

(Continued)

OTHER PUBLICATIONS

Korean Search Report dated Aug. 23, 2021.
Korean Search Report dated Dec. 28, 2021.
Korean Search Report dated Feb. 8, 2022.

*Primary Examiner* — Edward Tso
*Assistant Examiner* — Aaron Piggush
(74) *Attorney, Agent, or Firm* — Cha & Reiter, LLC

(57) ABSTRACT

Various embodiments of the disclosure relate to an apparatus and method for preventing overcharging of a battery. In this case, the electronic device includes a battery, at least one processor, and a memory electrically coupled to the at least one processor. The memory may store instructions, when executed, allowing the at least one processor to set a charge safety time corresponding to an external device upon connection with the external power device, charge the battery, based at least in part on power of the external power device, and update the charge safety time, based on a change of at least one of charging current and discharging current of the battery. Other embodiments may also be possible.

13 Claims, 12 Drawing Sheets

(58) Field of Classification Search
USPC .................. 320/103, 114, 134, 137, 155, 157
See application file for complete search history.

(56) References Cited

U.S. PATENT DOCUMENTS

| | | | |
|---|---|---|---|
| 2013/0119942 A1* | 5/2013 | Sutarwala | H02J 7/00047 320/137 |
| 2013/0257382 A1* | 10/2013 | Field | H02J 7/0086 320/134 |
| 2014/0192481 A1* | 7/2014 | Wojcik | G06F 21/86 361/679.55 |
| 2015/0180016 A1 | 6/2015 | Choi et al. | |
| 2016/0141893 A1 | 5/2016 | Lee et al. | |
| 2017/0005515 A1* | 1/2017 | Sanders | H02J 3/14 |

FOREIGN PATENT DOCUMENTS

| | | |
|---|---|---|
| KR | 10-2003-0049108 A | 6/2003 |
| KR | 10-2011-0017649 A | 2/2011 |
| KR | 10-1242455 B1 | 3/2013 |
| KR | 10-2015-0074439 A | 7/2015 |
| KR | 10-2016-0057091 A | 5/2016 |
| KR | 10-2016-0129626 A | 11/2016 |

* cited by examiner

METHOD FOR PREVENTING OVERCHARGING OF BATTERY AND ELECTRONIC DEVICE THEREFOR

CROSS REFERENCE TO RELATED APPLICATIONS

This application is a National Phase Entry of PCT International Application No. PCT/KR2018/002087, which was filed on Feb. 21, 2018, and claims a priority to Korean Patent Application No. 10-2017-0039874, which was filed on Mar. 29, 2017, the contents of which are incorporated herein by reference.

BACKGROUND ART

Various embodiments of the disclosure relate to an apparatus and method for preventing overcharging of a battery in an electronic device.

With the advance of information communication techniques and semiconductor techniques, a variety of electronic devices provide various functions. For example, a multimedia service may be various such as a voice call service, a message service, a broadcasting service, a wireless Internet service, a camera service, and a music playback service.

An electronic device such as a portable terminal, a tablet computer, a smartphone, or the like may use a battery as a power supply means to provide mobility. Accordingly, a user of the electronic device may use the electronic device more conveniently, beyond a wired environment for supplying power of the electronic device.

DISCLOSURE OF INVENTION

Technical Problem

When an electronic device is coupled with an external power device in a wired or wireless manner, a battery of the electronic device may be charged with power supplied from the external power device. When the electronic device is coupled with the external electronic device, a charging stability time may be set to prevent overcharging of the battery. The electronic device may cut off the charging of the battery when the charging stability time elapses even if the battery is not fully charged.

The charging stability time may include a fixed time. Accordingly, when current supplied to the battery varies due to a change in current consumed in the electronic device, the electronic device may have a problem in that the charging of the battery is randomly cut off before the battery is fully charged.

Various embodiments of the disclosure may provide an apparatus and method for adaptively controlling a charging stability time to correspond to a system change in an electronic device.

According to various embodiments of the disclosure, an electronic device includes a battery, at least one processor, and a memory electrically coupled to the at least one processor. The memory may store instructions, when executed, allowing the at least one processor to set a charging stability time corresponding to an external device upon connection with the external power device, charge the battery, based at least in part on power of the external power device, and update the charging stability time, based on a change of at least one of charging current and discharging current of the battery.

According to various embodiments of the disclosure, a method of operating an electronic device may include setting a charging stability time corresponding to an external device upon connection with the external power device, charging the battery, based at least in part on power of the external power device, and updating the charging stability time, based on a change of at least one of charging current and discharging current of the battery.

BEST MODE FOR CARRYING OUT THE INVENTION

Figure 1:
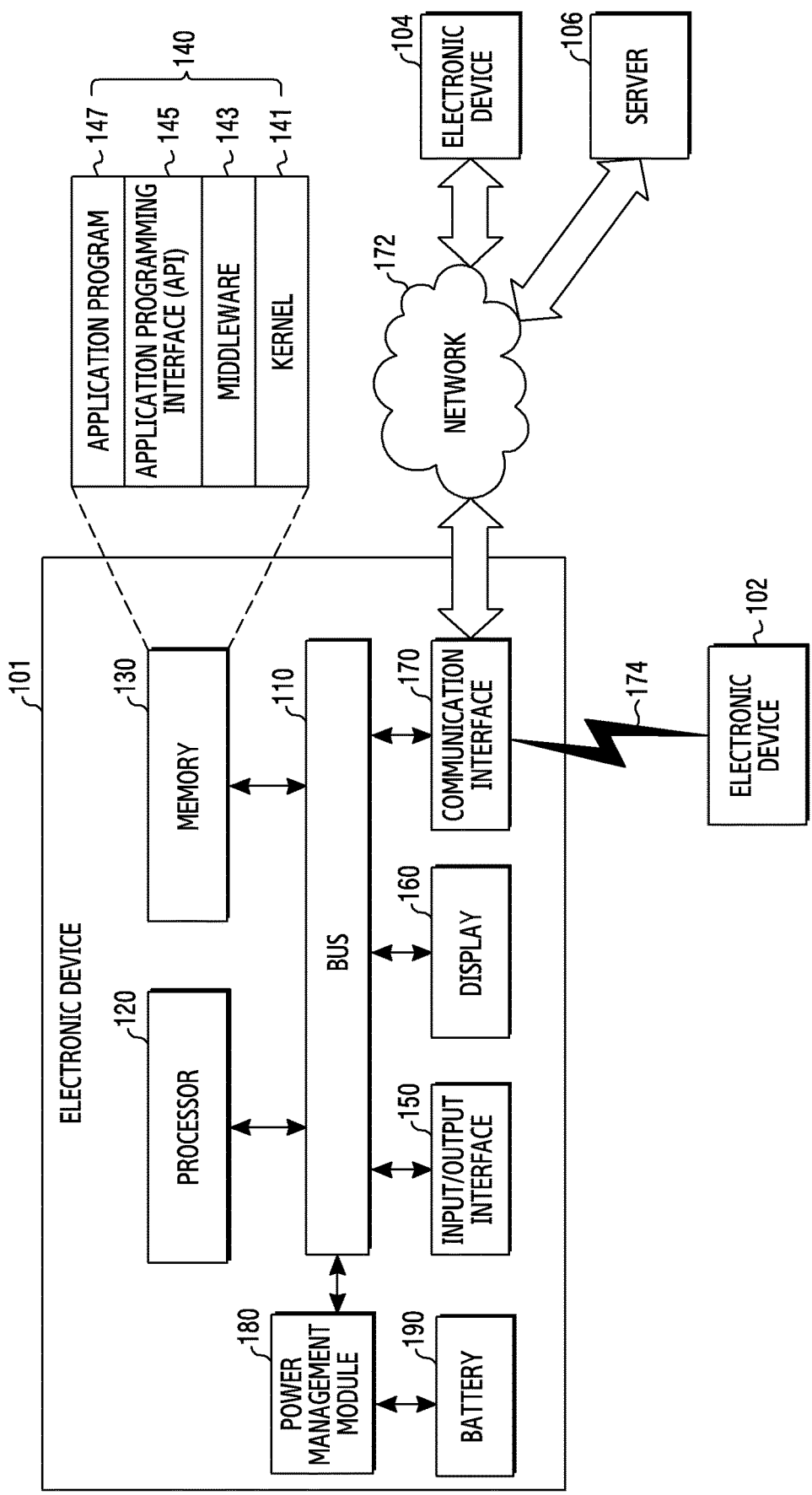
FIG. 1 illustrates an electronic device in a network environment according to various embodiments of the disclosure.

Hereinafter, various embodiments will be described with reference to the accompanying drawings. It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. A singular expression includes a plural concept unless there is a contextually distinctive difference therebetween.

In the disclosure, an expression "A or B", "A and/or B", or the like may include all possible combinations of items enumerated together. Although expressions such as "$1^{st}$" "$2^{nd}$", "first", and "second" may be used to express corresponding components, it is not intended to limit the corresponding components. When a certain (e.g., $1^{st}$) component is mentioned as being "operatively or communicatively coupled with/to" or "connected to" a different (e.g., $2^{nd}$) component, the certain component is directly coupled with/ to another component or can be coupled with/to the different component via another (e.g., $3^{rd}$) component.

An expression "configured to (or set)" used in the present disclosure can be replaced with, for example, "suitable for," "having the capacity to," "designed to," "adapted to," "made to," or "capable of" according to a situation. A term "configured to (or set)" may not always mean "specifically designed to" by hardware. Instead, in some situation, an expression "apparatus configured to" can mean that the apparatus "can" operate together with another apparatus or other components. For example, "a processor configured (or set) to perform A, B, and C" can be a dedicated processor (e.g., an embedded processor) for performing a corresponding operation or a generic-purpose processor (e.g., a Central Processing Unit (CPU) or an Application Processor (AP)) which can perform a corresponding operation by executing one or more software programs stored in a memory device.

An electronic device according to various embodiments of the present disclosure can include, for example, at least one of a smart phone, a tablet Personal Computer (PC), a mobile phone, a video phone, an e-book reader, a desktop PC, a laptop PC, a netbook computer, a workstation, a sever, a Personal Digital Assistant (PDA), a Portable Multimedia Player (PMP), an MPEG 3 (MP3) player, a mobile medical equipment, a camera, and a wearable device. The wearable device can include at least one of an accessory type (e.g., a watch, a ring, a bracelet, an ankle bracelet, a necklace, glasses, a contact lens, or a Head-Mounted-Device (HMD)), a fabric or clothing embedded type (e.g., electronic garments), a body attachable type (e.g., a skin pad or a tattoo), and an implantable circuit.

In some embodiments, the electronic device can include at least one of, for example, a television, a Digital Video Disk (DVD) player, an audio device, a refrigerator, an air-conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™, PlayStation™), an electronic dictionary, an electronic key, a camcorder, and an electronic frame.

According to other embodiments, the electronic device may include at least one of various medical devices (e.g., various portable medical measuring devices (e.g., a blood sugar measuring device, a hear rate measuring device, a blood pressure measuring device, a body temperature measuring device, etc.), Magnetic Resonance Angiography (MRA), Magnetic Resonance Imaging (MRI), Computed Tomography (CT), imaging equipment, ultrasonic instrument, etc.)), a navigation device, a Global Navigation Satellite System (GNSS), an Event Data Recorder (EDR), a Flight Data Recorder (FDR), a car infotainment device, an electronic equipment for ship (e.g., a vessel navigation device, a gyro compass, etc.), avionics, a security device, a car head unit, an industrial or domestic robot, a drone, an Automatic Teller's Machine (ATM) of financial institutions, Point Of Sales (POS) of shops, and Internet of things (e.g., a light bulb, various sensors, an electric or gas meter, a sprinkler device, a fire alarm, a thermostat, a streetlamp, a toaster, a fitness equipment, a hot water tank, a heater, a boiler, etc.).

According to some embodiments, the electronic device may include at least one of furniture or part of buildings/ constructions, an electronic board, an electronic signature receiving device, a projector, and various measurement machines (e.g., water supply, electricity, gas, propagation measurement machine, etc.). In various embodiments, the electronic device may be flexible, or may be a combination of at least two of the aforementioned various devices. The electronic device according to an embodiment of the disclosure is not limited to the aforementioned devices. The term 'user' used in the disclosure may refer to a person who uses the electronic device or a device (e.g., an Artificial Intelligence (AI) electronic device) which uses the electronic device.

FIG. 1 is a diagram of an electronic device in a network environment according to various embodiments of the present disclosure.

Referring to FIG. 1, an electronic device 101 can include a bus 110, a processor 120, a memory 130, an input/output interface 150, a display 160, a communication interface 170, a power management module 180 and a battery 190. In an embodiment, the electronic device 101 can omit at least one of the components or further include an additional component.

The bus 110 can include a circuit for connecting the components 120 through 190 and delivering communication signals (e.g., control messages or data) between the components 120 through 190.

The processor 120 may include one or more of a Central Processing Unit (CPU), an Application Processor (AP), a Communication Processor (CP), and an Image Signal Processor (ISP). The processor 120 may perform computations or data processing, for example, for control and/or communication of at least one different components of the electronic device 101.

According to an embodiment, upon connection with an external power device, the processor 120 may set a charging stability time for preventing overcharging of the battery 190. For example, upon connection with the external power device, the processor 120 may estimate a time required to fully charge the battery 190 based on at least one of rated capacity of the battery 190, charging current to be input to the electronic device 101, charging efficiency of the battery 190, temperature (e.g., external temperature and internal temperature of the electronic device 101), a cable type, and voltage of the battery 190. The processor 120 may set the charging stability time based on a time required to fully charge the battery 190 and an error history of the battery 190. For example, the processor 120 may set a temporary charging stability time based on the time required to fully charge the battery 190. In the presence of the error history of the battery 190, the processor 120 may set the charging stability time by updating (reducing) the temporary charging stability time based on the error history of the battery 190. For instance, the processor 120 may adaptively set an update range of the temporary charging stability time based on an error occurrence count of the battery 190.

According to an embodiment, if there is a change in at least one of charging current and discharging current of the battery 190, the processor 120 may update the charging stability time based on the charging current and discharging current of the battery 190. For example, the processor 120 may identify the charging current of the battery 190 at the arrival of an update period of the charging stability time. If there is a change in the charging current of the battery 190, the processor 120 may update the charging stability time to correspond to the changed charging current of the battery 190. For example, the processor 120 may determine the update period of the charging stability time based on the discharging current of the battery 190. For instance, when there is an increase in power used in an internal circuit of the electronic device 101, the processor 120 may determine that the discharging current of the battery 190 is increased. The processor 120 may decrease the update period of the charging stability time to correspond to the increase in the discharging current of the battery 190. For instance, when there is a decrease in the power used in the internal circuit of the electronic device 101, the processor 120 may determine that the discharging current of the battery 190 is decreased. The processor 120 may increase the update period of the charging stability time to correspond to the decrease in the discharging current of the battery 190. For instance, the discharging current of the battery 190 may include current supplied into the electronic device 101 to drive the internal circuit.

According to an embodiment, the processor 120 may determine whether the charging stability time is updated based on a reference range in which the charging current of the battery 190 is included. For example, when there is a change in the reference range in which the charging current of the battery 190 is included, the processor 120 may determine to update the charging stability time. For example, if the charging current of the battery 190 is included in a first reference range, the processor 120 may set the charging stability time to correspond to the first reference range. When the charging current of the battery 190 at a time where the update period of the charging stability time arrives is changed to be included in a second reference range, the processor 120 may determine to update the charging stability time. In this case, the processor 120 may update the charging stability time to correspond to the second reference range in which the charging current of the battery 190 is included.

According to an embodiment, the processor 120 may determine whether to update the charging stability time based on a variation of the charging current of the battery 190. For example, the processor 120 may detect the variation of the charging current of the battery 190 during the update period of the charging stability time. When there is a change in the charging current of the battery 190 at a time where the update period of the charging stability time arrives, the processor 120 may compare the variation of the charging current of the battery 190 with a reference variation. If the variation of the charging current of the battery 190 is less than the reference variation, the processor 120 may determine to update the charging stability time. In this case, the processor 120 may update the charging stability time to correspond to the changed charging current of the battery 190.

According to an embodiment, if the battery 190 is not fully-charged until the charging stability time arrives, the processor 120 may provide control to output error occurrence information of the battery 190. For example, the processor 120 may provide control to output the error occurrence information of the battery 190 by using at least one of a message, an image, a sound, and an indicator. For example, if the battery 190 is not fully charged until the charging stability time expires, the processor 120 may control the display 160 to output a battery checking request message. For example, if the battery 190 is not fully charged until the charging stability time arrives, the processor 120 may temporarily cut off the charging of the battery 190. For instance, an operation of temporarily cutting off the charging of the battery 190 may include a series of operations of cutting off the charging of the battery 190 in a state where the external power device is coupled to the electronic device 101. For example, if the electronic device 101 and the external power device are disconnected in a state where the charging of the battery 190 is temporarily cut off, the processor 120 may cancel the cutting off of the charging of the battery 190.

According to an embodiment, the processor 120 may provide control to cut off the charging of the battery 190 based on an error occurrence history of the battery 190. For example, if the battery 190 is not fully charged until the charging stability time expires, the processor 120 may compare an error occurrence count of the battery 190 with a reference count. If the error occurrence count of the battery 190 exceeds the reference count, the processor 120 may control the power management module 180 to cut off the charging of the battery 190. In this case, the processor 120 may provide control to output charging cutoff information in at least one of message, image, sound, and indicator forms. For instance, the cutting off of the charging of the battery 190 may include a series of operations of limiting the charging of the battery 190 even when the external power device is reconnected or another external power device is connected.

According to an embodiment, upon disconnection with the external power device, the processor 120 may initialize the charging stability time corresponding to the external power device. For example, the processor 120 may newly set the charging stability time corresponding to the external power device whenever the external power device is connected.

The memory 130 may include a volatile and/or a non-volatile memory. The memory 130 may store an instruction or data related to at least one different component of, for example, the electronic device 101. According to an embodiment, the memory 130 may store a plurality of different reference ranges for identifying the charging current of the battery 190. According to an embodiment, the memory 130 may store the charging current of the battery 190, which is detected during the update period of the charging stability time. According to an embodiment, the memory 130 may store an error history of the battery 190.

According to an embodiment, the memory 130 may store a software and/or a program 140. For example, the program 140 may include a kernel 141, a middleware 143, an Application Programming Interface (API) 145, or an application program (or an "application") 147. At least part of the kernel 141, middleware 143, or API 145 may be referred to as an Operating System (OS).

The kernel 141 can control or manage system resources (e.g., the bus 110, the processor 120, or the memory 130) used for performing operations or functions implemented by the other programs (e.g., the middleware 134, the API 145, or the application program 147). Additionally, the kernel 141 can provide an interface for controlling or managing the system resources by accessing an individual component of the electronic device 101 from the middleware 143, the API 145, or the application program 147.

The middleware 143 may perform, for example, a mediation role so that the API 145 or the application program 147 can communicate with the kernel 141 to exchange data. Further, the middleware 143 may handle one or more task requests received from the application program 147 according to a priority. For example, the middleware 143 may assign a priority capable of using the system resources (e.g., the bus 110, the processor 120, or the memory 130) of the electronic device 101 to at least one of the application programs 147, and may handle the one or more task requests. The API 145, as an interface through which the application 147 controls a function provided from the kernel 141 or the middleware 143, can include, for example, at least one interface or function (e.g., an instruction) for file control, window control, image processing, or character control.

The input/output interface 150 may transmit commands or data input from a user or a different external device to different component(s) of the electronic device 101, or may output commands or data received from the different component(s) of the electronic device 101 to the user or the different external device. For example, the input/output interface 150 may include at least one physical button such as a home button, a power button, a volume control button, or the like. For example, the input/output interface 150 may include a speaker for outputting an audio signal and a microphone for collecting the audio signal.

The display 160 may display a variety of content (e.g., text, image, video, icon, and/or symbol, etc.) to the user. For example, the display unit 160 may include a Liquid Crystal Display (LCD), a Light Emitting Diode (LED) display, an Organic Light-Emitting Diode (OLED) display, a Micro Electro Mechanical System (MEMS) display, or an electronic paper display. For example, the display 160 may include a touch screen. For instance, the display 160 may receive a touch, gesture, proximity, or hovering input by using an electronic pen or part of a user's body.

The communication interface 170, for example, can set a communication between the electronic device 101 and an external device (e.g., a first external electronic device 102, a second external electronic device 104, or a server 106). For example, the communication interface 170 can communicate with the external device (e.g., the second external electronic device 104 or the server 106) over a network 172 using wireless communication or wired communication.

According to an embodiment, the wireless communication may include cellular communication using at least one of LTE, LTE Advance (LTE-A), code division multiple access (CDMA), Wideband CDMA (WCDMA), Universal Mobile Telecommunications System (UMTS), Wireless Broadband (WiBro), Global System for Mobile Communications (GSM), and the like. According to an embodiment, a wireless communication 174 may include at least one of Wireless Fidelity (WiFi), Light Fidelity (LiFi), Bluetooth, Bluetooth Low Energy (BLE), Zigbee, Near Field Communication (NFC), magnetic secure transmission, Radio Frequency (RF), Body Area Network (BAN), and the like. According to an embodiment, the wireless communication may include a Global Navigation Satellite System (GNSS). The GNSS may be, for example, a Global Positioning System (GPS), a Global Navigation Satellite System (Glonass), a Beidou Navigation Satellite System (Beidou) or the European global satellite-based navigation system (Galileo). Hereinafter, the "GPS" and the "GNSS" may be used interchangeably in the disclosure. According to an embodiment, the wired communication may include at least one of Universal Serial Bus (USB), High Definition Multimedia Interface (HDMI), Recommended Standard-232 (RS-232), power-line communication, Plain Old Telephone Service (POTS), and the like. The network 172 may include, for example, at least one of a telecommunications network, a computer network (e.g., LAN or WAN), the Internet, and a telephone network.

Each of the first and second external electronic devices 102 and 104 can be of the same as or of a different type from the type of the electronic device 101. According to various embodiments, all or part of the operations executed in the electronic device 101 can be executed by one or more other electronic devices (e.g., the electronic devices 102 and 104, or the server 106). When the electronic device 101 is to perform a function or service automatically or by request, instead of or addition to performing the function or the service by the electronic device 101, the electronic device 101 can request at least part of the related function from other device (e.g., the electronic device 102 or 104, or the server 106). The other electronic device (e.g., the electronic device 102 or 104, or the server 106) can perform the requested function or an additional function and provide its result to the electronic device 101. The electronic device 101 can provide the requested function or service by processing the received result as it is or additionally. In doing so, for example, cloud computing, distributed computing, or client-server computing techniques can be used.

The power management module 180 may control charging and discharging of the battery 190. For example, the power management module 180 may provide the battery 190 with at least part of power supplied from the external power device. For example, the power management module 180 may supply power to the internal circuit of the electronic device 101. For example, the power module 180 may provide the internal circuit with power supplied from the battery 190 or the external power device. For instance, the power management module 180 may include at least one of a Power Management Integrated Circuit (PMIC) and a charging circuit.

According to an embodiment, the power management module 180 may control the charging of the battery 190. For example, at the expiry of the charging stability time, the power management module 180 may temporarily cut off the charging of the battery 190. For instance, the charging stability time may be set or updated by the processor 120. For example, the power management module 180 may cut off the charging of the battery 190 based on the error occurrence history of the battery 190. For example, if the error occurrence count of the battery 190 exceeds the reference count, the power management module 180 may cut off the charging of the battery 190 under the control of the processor 120.

According to various embodiments of the disclosure, the electronic device 101 may set and update the charging stability time through the power management module 180.

Figure 2:
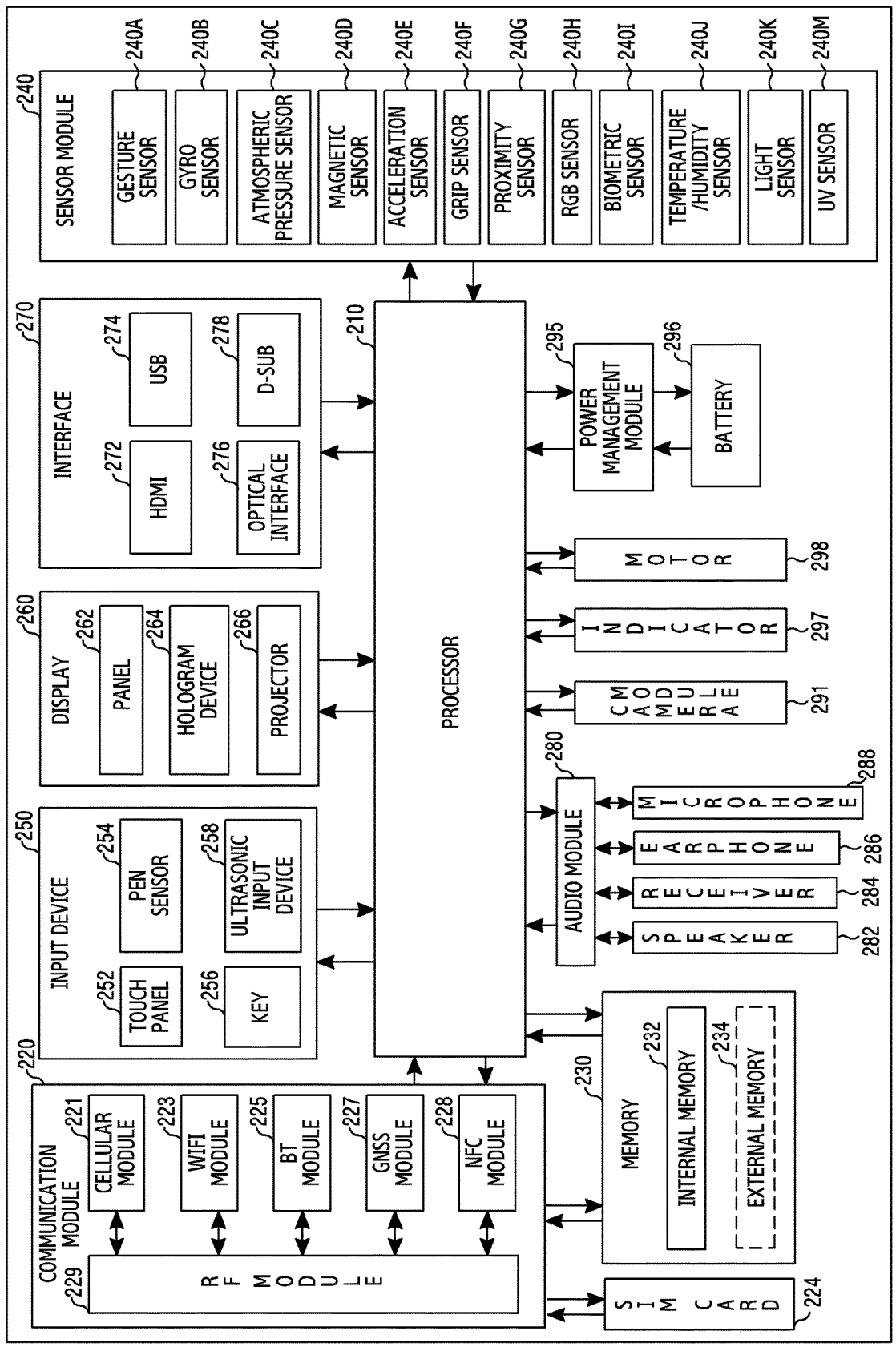
FIG. 2 is a block diagram of an electronic device 201 according to various embodiments.

FIG. 2 is a block diagram of an electronic device 201 according to various embodiments. The electronic device 201, for example, can include all or part of the electronic device 101 of FIG. 1. The electronic device 201 can include one or more processors (APs) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210, for example, can control a plurality of hardware or software components connected to the processor 210 by executing an OS or an application program, and process various data and operations. The processor 210 can be implemented with, for example, a System on Chip (SoC). According to one embodiment, the processor 210 can further include a Graphic Processing Unit (GPU) and/or an image signal processor. The processor 210 may include at least part (e.g., a cellular module 221) of the components shown in FIG. 2. The processor 210 can load and process commands or data received from at least one of the other components (e.g., a nonvolatile memory) into a volatile memory, and store various data in the nonvolatile memory.

According to an embodiment, upon connection with the external power device, the processor 210 may set a charging stability time based on a time required to fully charge the battery 296 and an error history of the battery 296. For instance, the time required to fully charge the battery 296 may be set based on at least one of rated capacity of the battery 296, charging current to be input to the electronic device 201, charging efficiency of the battery 296, temperature, a cable type, and voltage of the battery 296.

According to an embodiment, if there is a change in at least one of charging current and discharging current of the battery 296, the processor 210 may update the charging stability time based on the charging current and discharging current of the battery 296. For example, the processor 210 may determine whether to update the charging stability time based on the charging current of the battery 296 at the arrival of the update period of the charging stability time. For instance, the update period of the charging stability time may be determined based on the discharging current of the battery 296.

The communication module 220 can have the same or similar configuration to the communication interface 170 of FIG. 1. The communication module 220 can include, for example, a cellular module 221, a WiFi module 223, a Bluetooth (BT) module 225, a GNSS module 227 (e.g., a GPS module, a Glonass module, a Beidou module, or a Galileo module), a Near Field Communication (NFC) module 228, and a Radio Frequency (RF) module 229.

The cellular module 221 can provide, for example, voice call, video call, text service, or Internet service through a communication network. According to one embodiment, the cellular module 221 can identify and authenticate the electronic device 201 in the communication network by using the SIM 224 (e.g., a SIM card). The cellular module 221 can perform at least part of a function which can be provided from the processor 210. The cellular module 221 can further include a CP.

According to some embodiments, at least some (e.g., two or more) of the cellular module 221, the WiFi module 223, the BT module 225, the GPS module 227, and the NFC module 228 may be included in one Integrated Chip (IC) or IC package.

The RF module 229 can, for example, transmit and receive communication signals (e.g., RF signals). The RF module 229 can include, for example, a transceiver, a Power Amp Module (PAM), a frequency filter, a Low Noise Amplifier (LNA), or an antenna. According to another embodiment, at least one of the cellular module 221, the WiFi module 223, the BT module 225, the GNSS module 227, or the NFC module 228 can transmit and receive RF signals through a separate RF module. The SIM 224 can include, for example, a card including a SIM and/or an embedded SIM, and contain unique identification information (e.g., an Integrated Circuit Card Identifier (ICCID)) or subscriber information (e.g., an International Mobile Subscriber Identity (IMSI)).

The memory 230 (e.g., the memory 130 of FIG. 1) can include, for example, an internal memory 232 or an external memory 234. The internal memory 232 can include at least one of, for example, a volatile memory (e.g., Dynamic Random Access Memory (DRAM), Static RAM (SRAM), or Synchronous Dynamic RAM (SDRAM)), and a non-volatile memory (e.g., One Time Programmable Read Only Memory (OTPROM), Programmable ROM (PROM), Erasable and Programmable ROM (EPROM), Electrically Erasable and Programmable ROM (EEPROM), mask ROM, flash ROM, flash memory (e.g., NAND flash or NOR flash), hard drive, or Solid State Drive (SSD)). The external memory 234 can further include a flash drive, for example, Compact Flash (CF), Secure Digital (SD), micro SD, mini SD, extreme digital (xD), or memory stick. The external memory 234 can be functionally and/or physically connected to the electronic device 201 through various interfaces.

The sensor module 240 can, for example, measure physical quantities or detect an operating state of the electronic device 201, and thus convert the measured or detected information into electrical signals. The sensor module 240, for example, can include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red, Green, Blue (RGB) sensor), a bio sensor 240I, a temperature/humidity sensor 240J, an illumination sensor 240K, and an Ultra Violet (UV) sensor 240M. Additionally or alternately, the sensor module 240 can include, for example, an E-nose sensor, an Electromyography (EMG) sensor, an Electroencephalogram (EEG) sensor, an Electrocardiogram (ECG) sensor, an InfraRed (IR) sensor, an iris sensor, and/or a fingerprint sensor. The sensor module 240 can further include a control circuit for controlling at least one sensor therein. According to an embodiment, the electronic device 201 can further include, as part of the processor 210 or individually, a processor configured to control the sensor module 240 and thus control the sensor module 240 while the processor 210 is sleeping.

The input device 250 can include, for example, a touch panel 252, a (digital) pen sensor 254, a key 256, or an ultrasonic input device 258. The touch panel 252 can use at least one of, for example, capacitive, resistive, infrared, and ultrasonic methods. Also, the touch panel 252 may further include a control circuit. The touch panel 252 can further include a tactile layer and provide a tactile response to the user. The (digital) pen sensor 254 can include, for example, part of a touch panel or a separate sheet for recognition. The key 256 can include, for example, a physical button, a touch key, an optical key, or a keypad. The ultrasonic input device 258 can detects ultrasonic waves from an input tool through a microphone (e.g., the microphone 288) and thus obtain data corresponding to the detected ultrasonic waves.

The display 260 may include a panel 262, a hologram unit 264, a projector 266, and/or a control circuit for controlling these elements. The panel 262 may be implemented, for example, in a flexible, transparent, or wearable manner. The panel 262 may be constructed as one module with the touch panel 252. According to an embodiment, the panel 262 may include a pressure sensor (or a force sensor) capable of measuring pressure information (e.g., a pressure coordinate and pressure strength) for a user's touch. The pressure sensor may be implemented in an integral form with respect to the touch panel 252, or may be implemented as one or more sensors separated from the touch panel 252. The hologram unit 264 may use an interference of light and show a stereoscopic image in the air. The projector 266 may display an image by projecting a light beam onto a screen. The screen may be located, for example, inside or outside the electronic device 201. The interface 270 may include, for example, a High-Definition Multimedia Interface (HDMI) 272, a Universal Serial Bus (USB) 274, an optical communication interface 276, or a D-subminiature (D-sub) 278. The interface 270 may be included, for example, in the communication interface 170 of FIG. 1. Additionally or alternatively, the interface 270 may include, for example, a Mobile High-definition Link (MHL) interface, a Secure Digital (SD)/Multi-Media Card (MMC) interface, or an Infrared Data Association (IrDA) standard interface.

The audio module 280 may bilaterally convert, for example, a sound and electric signal. At least some components of the audio module 280 may be included in, for example, the input/output interface 150 of FIG. 1. The audio module 280 may convert sound information which is input or output, for example, through a speaker 282, a receiver 284, an earphone 286, the microphone 288, or the like. The camera module 291 (e.g., the camera 180 of FIG. 1) is, for example, a device for image and video capturing, and according to an embodiment, may include one or more image sensors (e.g., a front sensor or a rear sensor), a lens, an Image Signal Processor (ISP), or a flash (e.g., LED or xenon lamp). The power management module 295 may manage, for example, power of the electronic device 201. According to an embodiment, the power management module 295 may include a Power Management Integrated Circuit (PMIC), a charger Integrated Circuit (IC), or a battery fuel gauge. The PMIC may have a wired and/or wireless charging type. The wireless charging type may include, for example, a magnetic resonance type, a magnetic induction type, an electromagnetic type, or the like, and may further include an additional circuit for wireless charging, for example, a coil loop, a resonant circuit, a rectifier, or the like. The battery gauge may measure, for example, residual quantity of the battery 296 and voltage, current, and temperature during charging. The battery 296 may include, for example, a rechargeable battery and/or a solar battery.

The indicator 297 may display a specific state, for example, a booting state, a message state, a charging state, or the like, of the electronic device 201 or part thereof (e.g., the processor 210). The motor 298 may convert an electric signal into a mechanical vibration, and may generate a vibration or haptic effect. The electronic device 201 may include a mobile TV supporting device (e.g., a GPU) capable of processing media data according to a protocol of, for example, Digital Multimedia Broadcasting (DMB), Digital Video Broadcasting (DVB), mediaFlo™, or the like. Each of the components described in the disclosure may consist of one or more components, and names thereof may vary depending on a type of electronic device. In the electronic device (e.g., the electronic device 201) according to various embodiments, some of the components may be omitted, or additional other components may be further included. Alternatively, some of the components of the electronic device according to various embodiments may be combined and constructed as one entity, so as to equally perform functions of corresponding components before combination.

Figure 3:
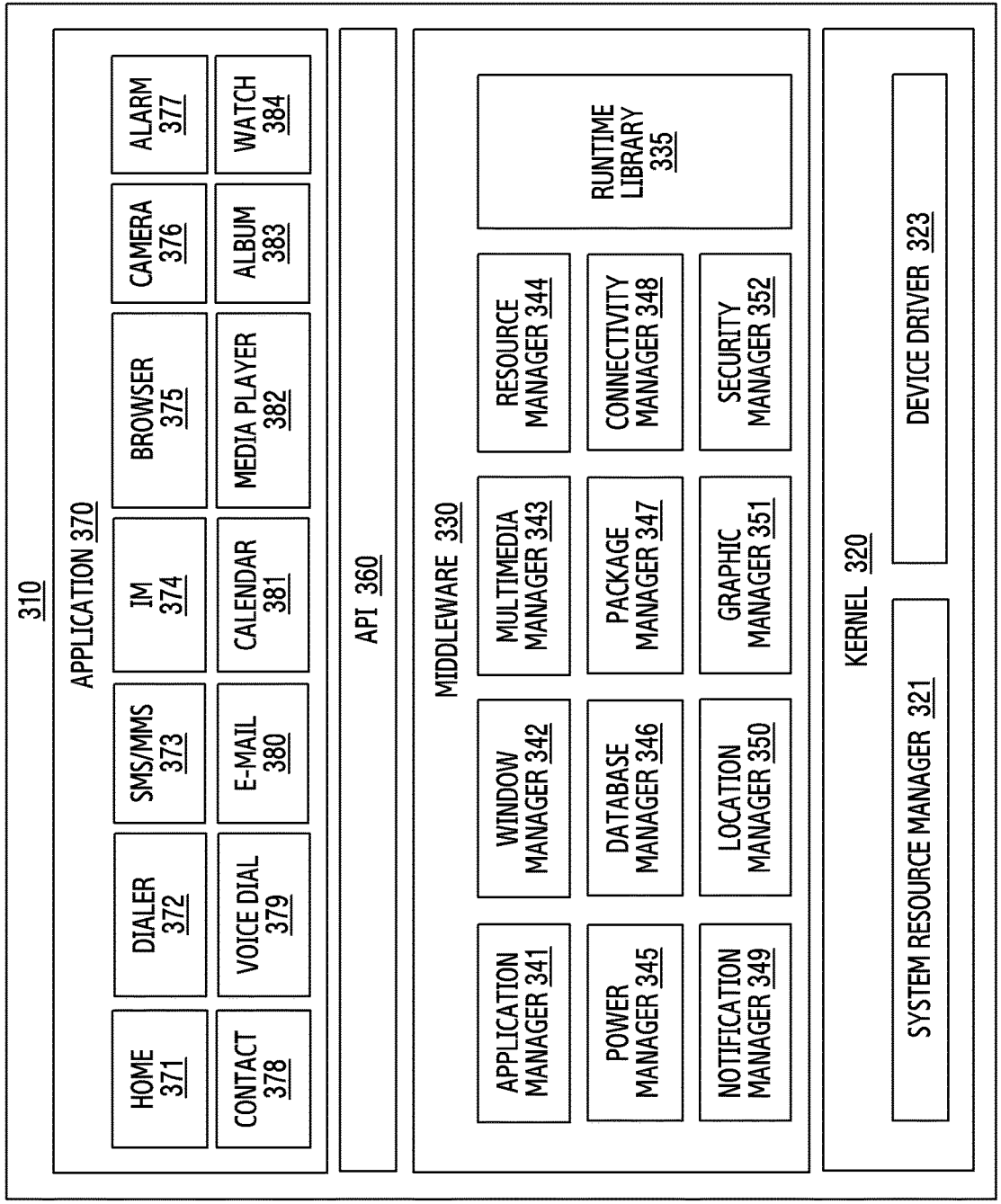
FIG. 3 is a block diagram of a program module according to various embodiments.

FIG. 3 is a block diagram of a program module according to various embodiments. According to an embodiment, a program module 310 (e.g., the program 140 of FIG. 1) may include an Operating System (OS) for controlling a resource related to an electronic device (e.g., the electronic device 101 of FIG. 1) or various applications (e.g., the application 147 of FIG. 1) driven on the OS. The OS may be, for example, Android™, iOS™, Windows™, Symbian™, Tizen™, or Bada™.

Referring to FIG. 3, the programming module 310 may include a kernel 320 (e.g., the kernel 141 of FIG. 1), a middleware 330 (e.g., the middleware 143 of FIG. 1), an Application Programming Interface (API) 360 (e.g., the API 145 of FIG. 1), and/or an application 370 (e.g., the application program 147 of FIG. 1). At least part of the program module 310 can be preloaded on the electronic device, or can be downloaded from an external electronic device (e.g., the electronic devices 102 and 104, the server 106, etc., of FIG. 1).

The kernel 320 can include, for example, a system resource manager 321 and/or a device driver 323. The system resource manager 321 can control, allocate, or retrieve a system resource. According to one embodiment, the system resource manager 321 can include a process management unit, a memory management unit, or a file system management unit. The device driver 323 can include, for example, a display driver, a camera driver, a Bluetooth driver, a sharing memory driver, a USB driver, a keypad driver, a WiFi driver, an audio driver, or an Inter-Process Communication (IPC) driver.

The middleware 330, for example, can provide a function commonly required by the application 370 or provide various functions to the application 370 through the API 360 so that the application 370 can efficiently use limited system resources inside the electronic device. According to one embodiment, the middleware 330 (e.g., the middleware 143) can include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include, for example, a library module used by a complier to add a new function through a programming language while the application 370 is running. The runtime library 335 can manage input/output, memory, or arithmetic function. The application manager 341 may manage, for example, a life cycle of the applications 370. The window manager 342 may manage a Graphic User Interface (GUI) resource used in a screen. The multimedia manager 343 may recognize a format required to reproduce various media files, and may use a codec suitable for the format to perform encoding or decoding of the media file. The resource manager 344 may manage a source code or memory space of the applications 370. The power manager 345 may manage, for example, a battery or power, and may provide power information or the like required for the operation. According to an embodiment, the power manager 345 may interwork with a Basic Input/Output System (BIOS).

According to an embodiment, if an external power device is coupled to the electronic device, the power manager 345 may set a charging stability time based on a battery error history and a full-charge time of the battery of the electronic device. According to an embodiment, if there is a change in at least one of charging current and discharging current of the battery, the power manager 345 may update the charging stability time based on the charging current and discharging current of the battery. For example, the power manager 345 may determine whether to update the charging stability time based on the charging current of the battery for every update period corresponding to the discharging current of the battery.

The database manager 346 may generate, search, or change a database to be used, for example, in the application 370. The package manager 347 may manage an installation or update of an application distributed in a form of a package file.

The connectivity manager 348 may manage, for example, a wireless connection. The notification manager 349 may provide a user with an event such as an incoming message, an appointment, a proximity notification, or the like. The location manager 350 may manage, for example, location information of the electronic device. The graphic manager 351 may manage, for example, a graphic effect to be provided to the user or a user interface related thereto. According to an embodiment, upon detecting an object from an image displayed on the display 160, the graphic manager 351 may manage a graphic effect for displaying detection information corresponding to configuration information of the object.

The security manager 352 may provide, for example, system security or user authentication. According to an embodiment, the middleware 330 may further include a telephony manager for managing a voice or video telephony function of the electronic device or a middleware module capable of constructing a combination of various functions of the aforementioned components. According to an embodiment, the middleware 330 may provide a module specified for each type of operating system. The middleware 330 may dynamically delete some of the existing components or may add new components. The API 360 is, for example, a set of API programming functions, and may be provided with other configurations according to an operating system. For example, in case of Android or IOS, one API set may be provided for each platform, and in case of Tizen, two or more API sets may be provided.

The application 370 may include one or more applications capable of providing a function of, for example, a home 371, a dialer 372, a Short Message Service (SMS)/Multimedia Messaging Service (MMS) 373, an Instant Message (IM) 374, a browser 375, a camera 376, an alarm 377, a contact 378, a voice dial 379, an e-mail 380, a calendar 381, a media player 382, an album 383, a clock 384, a health care (e.g., an application for measuring a physical activity level, a blood sugar level, etc.), or providing of environment information (e.g., providing of atmospheric pressure, humidity, or temperature information). According to an embodiment, the application 370 may include an information exchange application capable of supporting information exchange between the electronic device and an external electronic device. The information exchange application may include, for example, a notification relay application for relaying specific information to the external electronic device or a device management application for managing the external electronic device. For example, the notification relay application may relay notification information generated in another application of the electronic device to the external electronic device, or may receive notification information from the external electronic device and may provide it to the user. The device management application may install, delete, or update, for example, a function (e.g., turning on/turning off the external electronic device itself (or some components thereof) or adjusting of a display illumination (or a resolution)) of an external electronic device which communicates with the electronic device, or an application which operates in the external electronic device. According to an embodiment, the application 370 may include an application specified according to an attribute (e.g., a healthcare application of a mobile medical device) of the external electronic device. According to an embodiment, the application 370 may include an application received from the external electronic device. At least part of the program module 310 may be implemented (e.g., executed) in software, firmware, hardware (e.g., the processor 210), or at least two or more of combinations thereof, and may include modules, programs, routines, sets of instructions, processes, or the like for performing one or more functions.

According to various embodiments of the disclosure, an electronic device includes a battery, at least one processor, and a memory electrically coupled to the at least one processor. The memory may store instructions, when executed, allowing the at least one processor to set a charging stability time corresponding to an external device upon connection with the external power device, charge the battery, based at least in part on power of the external power device, and update the charging stability time, based on a change of at least one of charging current and discharging current of the battery.

According to various embodiments, the instructions may allow the at least one processor to set the charging stability time corresponding to the external power device based on an error history of the battery and a time required to fully charge the battery.

According to various embodiments, the instructions may allow the at least one processor to determine an update period based on the discharging current of the battery, identify the charging current of the battery at the arrival of the update period, and update the charging stability time based on the charging current of the battery.

According to various embodiments, the instructions may allow the at least one processor to detect the discharging current of the battery based on current consumed in an internal circuit of the electronic device.

According to various embodiments, the instructions may allow the at least one processor to identify a reference range in which the charging current of the battery is included, and update the charging stability time based on the reference range if there is a change in the reference range in which the charging current of the battery is included.

According to various embodiments, the instructions may allow the at least one processor to identify a variation of the charging current of the battery if there is a change in the charging current of the battery, determine whether to update the charging stability time based on the variation of the charging current of the battery, and update the charging stability time based on the charging current of the battery upon determining to update the charging stability time.

According to various embodiments, the instructions may allow the at least one processor to detect the charging current of the battery during the update period, and detect the variation of the charging current of the battery based on the battery's charging current detected during the update period.

According to various embodiments, the instructions may allow the at least one processor to identify the charging state of the battery at the expiry of the charging stability time, and control the memory to store error occurrence information of the battery if the battery is not fully charged.

According to various embodiments, the electronic device further includes a display. The instructions may allow the at least one processor to identify the charging state of the battery at the expiry of the charging stability time, and control the display to output error occurrence information of the battery if the battery is not fully charged.

According to various embodiments, the instructions may allow the at least one processor to identify the charging state of the battery at the expiry of the charging stability time, identify an error occurrence count of the battery if the battery is fully charged, and cut off the charging of the battery based on the error occurrence count of the battery.

Figure 4:
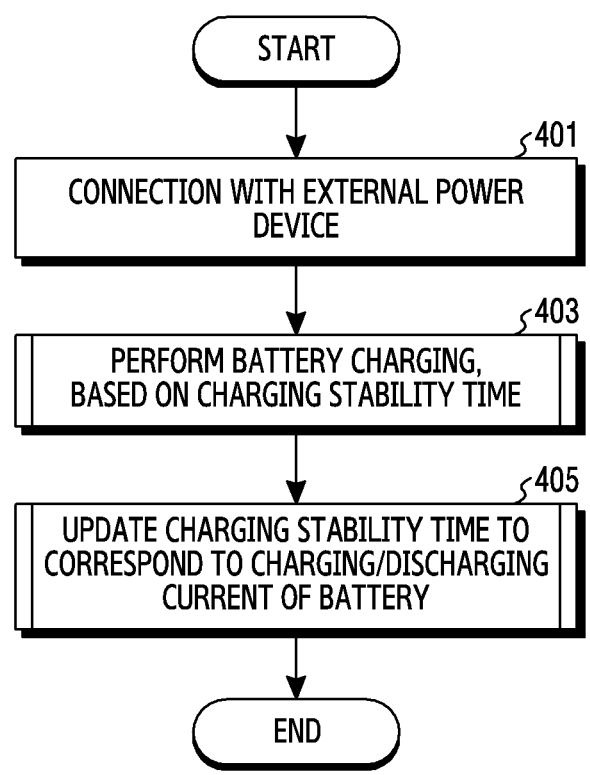
FIG. 4 is a flowchart for updating a charging stability time of a battery in an electronic device according to various embodiments of the disclosure.
Figure 5A:
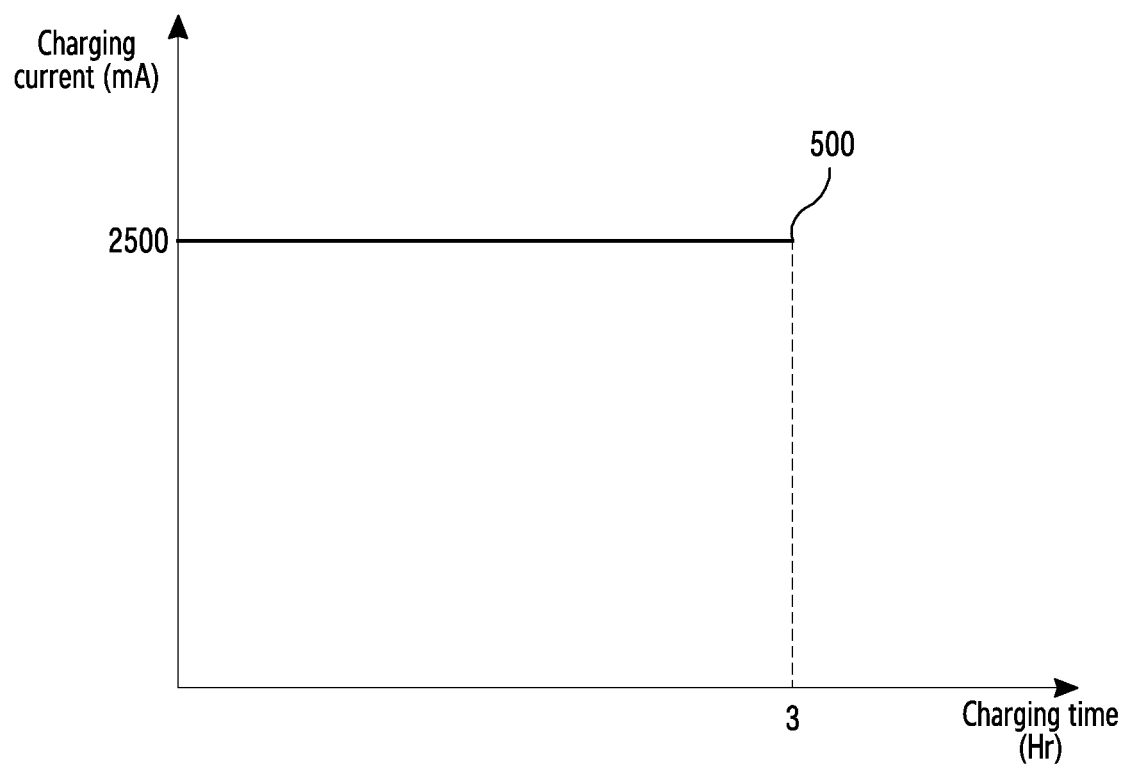
FIG. 5A is a graph illustrating a charging stability time of a battery in an electronic device according to various embodiments of the disclosure.
Figure 5B:
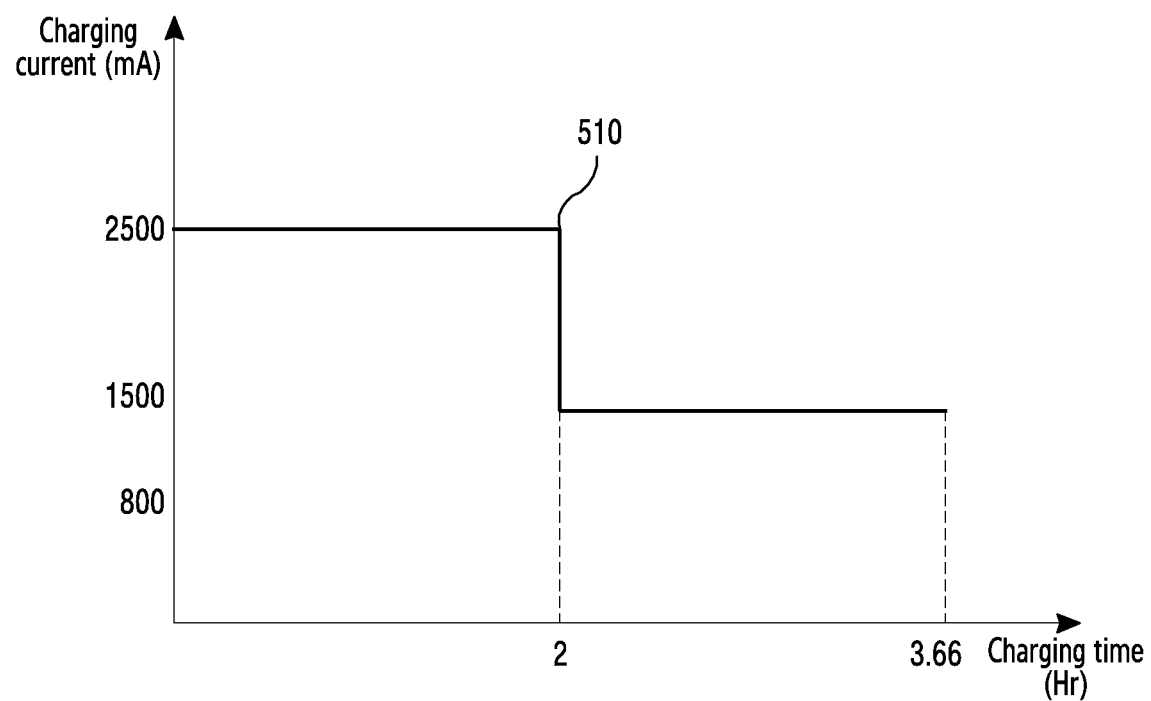
FIG. 5B is a graph illustrating a charging stability time of a battery in an electronic device according to various embodiments of the disclosure.
Figure 5C:
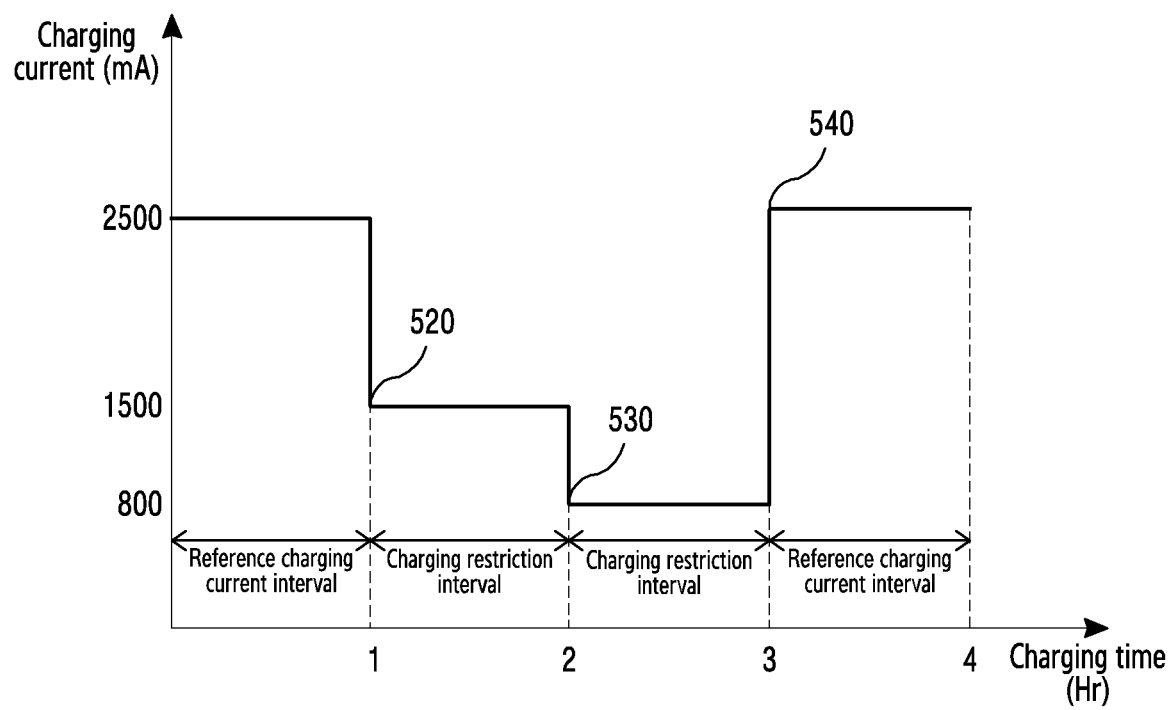
FIG. 5C is a graph illustrating a charging stability time of a battery in an electronic device according to various embodiments of the disclosure.

FIG. 4 is a flowchart for updating a charging stability time of a battery in an electronic device according to various embodiments of the disclosure. FIG. 5A to FIG. 5C are graphs illustrating a charging stability time of a battery in an electronic device according to various embodiments of the disclosure. Hereinafter, the electronic device may include the electronic device 101 of FIG. 1 or at least part (e.g., the processor 120) of the electronic device 101.

Referring to FIG. 4, according to various embodiments, in operation 401, the electronic device may detect a connection with an external power device. For example, the processor 120 may identify whether the connection with the external power device using a wired cable is detected through the input/output interface 150 of FIG. 1 or the interface 270 (e.g., the USB 274) of FIG. 2. For instance, the external power device may include at least one of a charging device (e.g., an adaptor or a cable) and a secondary battery. For example, the processor 120 may identify whether it is connected with the external power device through a wireless power reception module (not shown) of the electronic device 101.

According to various embodiments, in operation 403, the electronic device may charge the battery 190 with power supplied from the external power device based on the charging stability time of the battery 190. For example, if the external power device is coupled to the electronic device 101, the processor 120 may calculate a time required to fully charge the battery 190 based on additional information or the power supplied from the external power device. For instance, the additional information may include power-related information to be exchanged based on a communication protocol between the external power device and the electronic device. The power-related information may include at least one piece of information among a type of the external power device and a charging solution. The additional information may be used in determining of power with which transmission/reception is performed between the external power device and the electronic device 101. According to various embodiments, the processor 120 may set the charging stability time of the battery 190 based on an error history of the battery 190 and a time required to fully charge the battery 190. According to various embodiments, the time required to fully charge the battery 190 may be set based on at least one of rated capacity of the battery 190, charging current to be input to the electronic device 101, charging efficiency of the battery 190, external temperature of the electronic device 101, internal temperature of the electronic device 101, a cable type, and voltage of the battery 190. For instance, the charging stability time of the battery 190 may include a maximum time of charging using the external power device, which is predetermined to prevent overcharging of the battery 190.

According to various embodiments, in operation 405, the electronic device may update the charging stability time based on a change in at least one of charging current and discharging current of the battery 190. For example, the processor 120 may determine an update period of the charging stability time corresponding to the discharging current of the battery 190. The processor 120 may detect the charging current of the battery 190 at the arrival of the update period of the charging stability time. If there is a change in the charging current of the battery 190, the processor 120 may update the charging stability time based on the changed charging current of the battery 190. For example, if the charging current of the battery 190 is different from the charging current detected at a previous update period, the processor 120 may determine to update the charging stability time. For example, if a reference range in which the charging current of the battery 190 is included is different from the reference range in which the charging current detected at the previous update period is included, the processor 120 may determine to update the charging stability time.

According to an embodiment, as shown in equation (1) below, the processor 120 may set the charging stability time of the battery 190 based on a variation of the charging current and the remaining time for fully charging the battery 190.

$$\text{charging stability time} = (\text{previous charging stability time} - \text{charging time}) \times (\text{last charging current}/\text{present charging current}) \qquad (1)$$

For instance, in equation (1), the charging stability time may include the charging stability time which is updated in operation 407, and the previous charging stability time may include the charging stability time which is set in operation 403. The charging time may include a time required to fully charge the battery 190 through the external power device. The last charging current may include the charging current of the battery 190, which is detected at the previous update period, and the present charging current may include the charging current of the battery 190, which is detected at the present update period.

According to an embodiment, as shown in FIG. 5A, if capacity of the battery 190 is 3500 mA and reference current of the external device is 2500 mA, the processor 120 may set a charging stability time (see 500) (e.g., 3 hours) based on equation (1) (e.g., (3−0)×(2500/2500)).

According to an embodiment, as shown in FIG. 5B, if the charging current of the battery 190 is changed to 1500 mA (see 510) when 2 hours elapse in the charging with the reference current of 2500 mA, the battery 190 may update the charging stability time (e.g., 1.66 hours) based on equation (1) (e.g., (3−2)×(2500/1500)). For example, upon detecting a change in internal temperature (e.g., heat generation or lower temperature) of the electronic device 101, the processor 120 may limit the charging current of the battery 190 to a specific level (e.g., 1500 mA). For instance, the processor 120 may variably limit an amount of charging current of the battery 190 based on the internal temperature of the electronic device 101.

According to an embodiment, as shown in FIG. 5C, if the charging current of the battery 190 is changed to 1500 mA (see 520) when 1 hour elapses in the charging with the reference current of 2500 mA, the battery 190 may update the charging stability time (e.g., 3.3 hours) based on equation (1) (e.g., (3−1)×(2500/1500)). According to an embodiment, if the charging current of the battery 190 is changed to 800 mA (see 530) when 1 hour elapses in the charging with the reference current of 1500 mA, the battery 190 may update the charging stability time (e.g., 4.3 hours) based on equation (1) (e.g., (3.3−1)×(1500/800)). According to an embodiment, if the charging current of the battery 190 is changed to 2500 mA (see 540) when 1 hour elapses in the charging with the reference current of 800 mA, the battery 190 may update the charging stability time (e.g., 1 hour) based on equation (1) (e.g., (4.3−1)×(800/2500)). For example, the processor 120 may change the charging current of the battery 190 based on charging efficiency of the battery 190 and a state change of an internal circuit of the electronic device 101.

According to an embodiment, in the presence of an error history of the battery 190, the processor 120 may update the charging stability time based on a control variable corresponding to the error history of the battery 190. For example, upon detecting error occurrence of the battery 190 at a previous time, the processor 120 may reduce the charging stability time calculated using equation (1) based on the control variable corresponding to the error history of the battery 190. For instance, the control variable may include a time reduction range corresponding to an error occurrence count of the battery 190.

According to various embodiments of the disclosure, the electronic device 101 may set the charging stability time of the battery 190 by using another equation or another algorithm different from equation (1).

Figure 6:
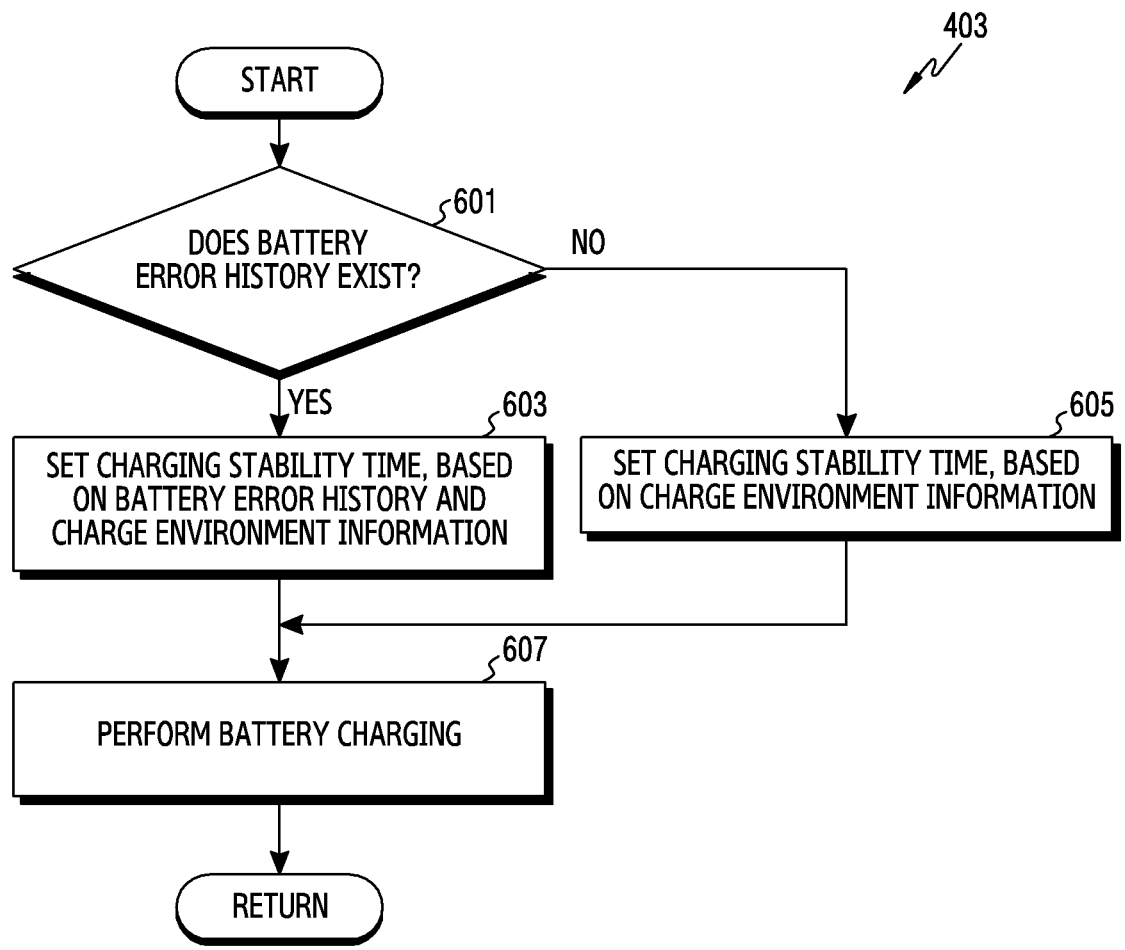
FIG. 6 is a flowchart for setting a charging stability time of a battery based on an error history of a battery in an electronic device according to various embodiments of the disclosure.

FIG. 6 is a flowchart for setting a charging stability time of a battery based on an error history of a battery in an electronic device according to various embodiments of the disclosure. Hereinafter, an operation of setting a charging stability time of the battery in the operation 403 of FIG. 4 will be described. Hereinafter, the electronic device may include the electronic device 101 of FIG. 1 or at least part (e.g., the processor 120) of the electronic device 101.

Referring to FIG. 6, according to various embodiments, in operation 601, upon detecting a connection with an external power device (e.g., the operation 401 of FIG. 4), the electronic device may identify whether there is an error history for the battery 190 of the electronic device. For example, upon occurrence of an error of the battery 190, the processor 120 may control the memory 130 to store error occurrence information of the battery 190. For example, the memory 130 may store the error occurrence information of the battery 190 in a tag form. Upon detecting the connection with the external power device, the processor 120 may identify whether the error history of the battery 190 exists, which is stored in the memory 130. According to various embodiments, upon occurrence of the error of the battery 190, the processor 120 may control the communication interface 170 to transmit the error occurrence information of the battery 190 to an external server. Upon detecting the connection with the external power device, the processor 120 may identify whether the error history of the battery 190 exists, which is stored in the external server, through the communication interface 170. According to various embodiments, the error history of the battery 190 may include at least one of leakage current generation information of the electronic device 101, charging cutoff information, and information of a state where the battery 190 is not fully charged at a time where the charging stability time expires.

According to various embodiments, in operation 603, in the presence of the error history of the battery 190, the electronic device may set the charging stability time corresponding to the external power device based on the error history of the battery 190 and charging environment information. For example, the processor 120 may set a temporary charging stability time based on the charging environment information corresponding to the external power device. The processor 120 may set the charging stability time corresponding to the external power device by updating the temporary charging stability time based on the error history of the battery 190. For example, the processor 120 may detect a time reduction range corresponding to the error occurrence count of the battery 190. The processor 120 may set the charging stability time corresponding to the external power device by reducing the temporary charging stability time to correspond to the time reduction range corresponding to the error occurrence count of the battery 190.

According to various embodiments, in operation 605, in the absence of the error history of the battery 190, the electronic device may set the charging stability time corresponding to the external power device based on the charging environment information. For example, the charging environment information may include at least one of rated capacity of the battery 190, charging current to be input to the electronic device 101, charging efficiency of the battery 190, external temperature of the electronic device 101, internal temperature of the electronic device 101, a cable type, and voltage of the battery 190.

According to various embodiments, in operation 607, the electronic device may charge the battery 190 by using at least part of power supplied from the external power device. For example, at the expiry of the charging stability time while charging the battery 190, the processor 120 may provide control to temporarily cut off the charging of the battery 190. For example, the processor 120 may control the power management module 180 to charge the battery 190 by using at least part of the power supplied from the external power device. The processor 120 may monitor driving of a timer corresponding to the charging stability time while charging the battery 190. At the expiry of the driving of the timer corresponding to the charging stability time, the processor 120 may control the power management module 180 to temporarily cut off the charging of the battery 190.

According to an embodiment, upon disconnection with the external power device in a state where the charging of the battery 190 is temporarily cut off, the electronic device (e.g., the processor 120) may cancel the cutting off of the charging of the battery 190.

Figure 7:
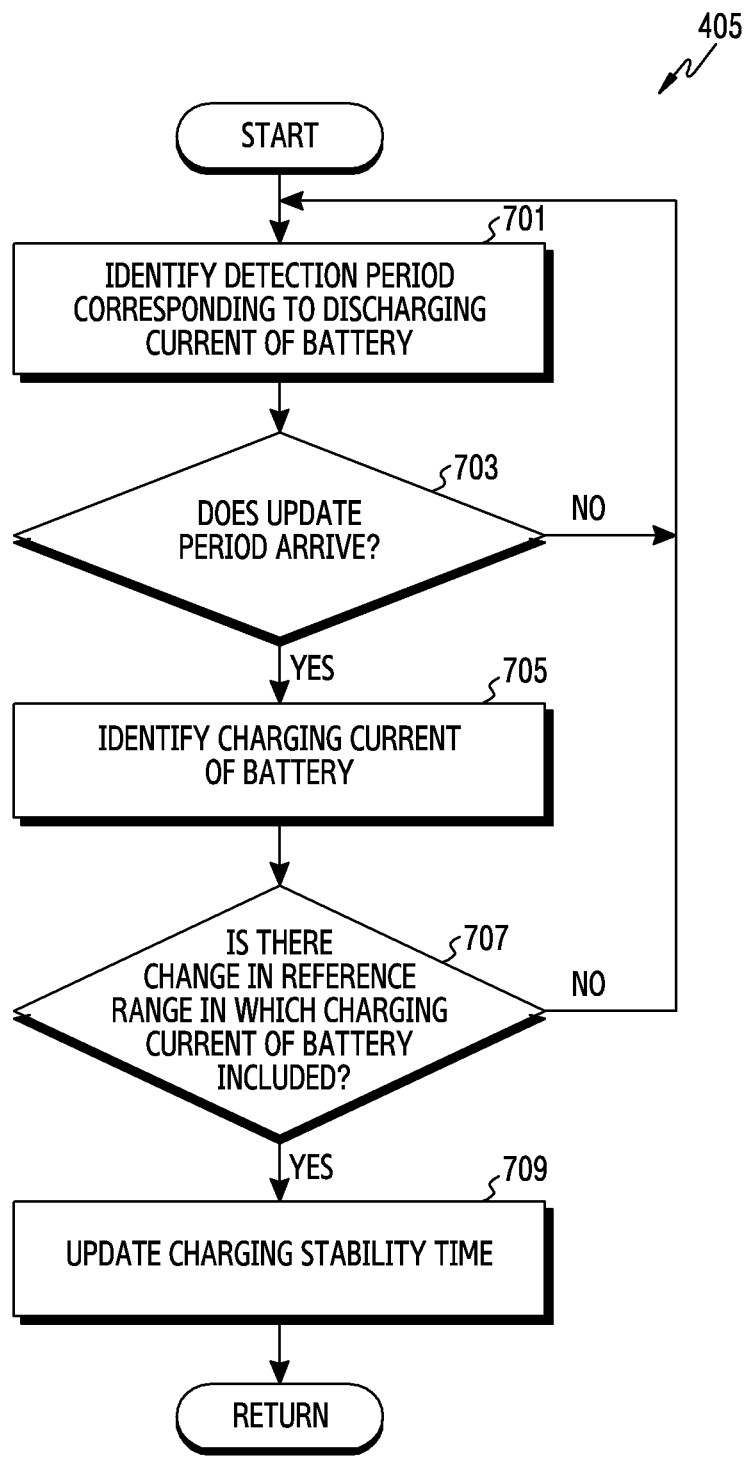
FIG. 7 illustrates an example of a flowchart for periodically identifying a change in charging current of a battery in an electronic device according to various embodiments of the disclosure.

FIG. 7 illustrates an example of a flowchart for periodically identifying a change in charging current of a battery in an electronic device according to various embodiments of the disclosure. Hereinafter, an operation of updating a charging stability time of the battery in the operation 405 of FIG. 4 will be described. Hereinafter, the electronic device may include the electronic device 101 of FIG. 1 or at least part (e.g., the processor 120) of the electronic device 101.

Referring to FIG. 7, according to various embodiments, in operation 701, if the battery 190 is charged based on power supplied from an external power device (e.g., the operation 403 of FIG. 4), the electronic device may identify an update period corresponding to discharging current of the battery 190. For example, the processor 120 may set an update period of a charging stability time to be relatively short with the increase in the discharging current of the battery 190. The processor 120 may set the update period of the charging stability time to be relatively long with the decrease in the discharging current of the battery 190. For example, the processor 120 may estimate the discharging current of the battery 190 based on a driving state of an internal circuit of the electronic device 101. For instance, if the display 160 is activated, the processor 120 may determine that the discharging current of the battery 190 is increased due to an increase in power used in the internal circuit of the electronic device 101. For instance, if the display 160 is deactivated, the processor 120 may determine that the discharging current of the battery 190 is decreased due to a decrease in power used in the internal circuit of the electronic device 101.

According to various embodiments, in operation 703, the electronic device may identify whether the update period of the charging stability time arrives. For example, the processor 120 may drive a timer which uses the update period of the charging stability time as a driving time. At the expiry of the driving of the timer, the processor 120 may determine that the update period of the charging stability time arrives.

According to various embodiments, in operation 701, if the update period of the charging stability time does not arrive, the electronic device may identify again the update period corresponding to the discharging current of the battery 190.

According to various embodiments, in operation 705, at the arrival of the update period of the charging stability time, the electronic device may identify the charging current of the battery 190. For example, the power management module 180 may provide current supplied from the external power device to at least one of the battery 190 and the internal circuit of the electronic device 101. At the expiry of the timer which uses the update period of the charging stability time as the driving time, the processor 120 may identify an amount of current used for the charging of the battery 190 out of current supplied from the external power device through the power management module 180.

According to various embodiments, in operation 707, the electronic device may identify whether there is a change in a reference range in which the charging current of the battery 190 is included. For example, if there is an increase in current (e.g., system current) required in the internal circuit of the electronic device 101, the power management module 180 may increase the amount of current supplied to the internal circuit out of the current supplied from the external power device. Accordingly, the power management module 180 may relatively decrease the charging current of the battery 190 due to the increase in the system current. For example, the processor 120 may detect the reference range in which the charging current of the battery 190 is included and which is identified through the power management module 180. The processor 120 may identify whether the reference range in which the charging current of the battery 190 is included is different from the reference range in which the charging current detected at the previous update period is included. According to various embodiments, the processor 120 may identify whether there is a change in the charging current of the battery 190.

According to various embodiments, if there is no change in the reference range in which the charging current of the battery 190 is included, in operation 701, the electronic device may identify again the update period corresponding to the discharging current of the battery 190. For example, if the reference range in which the charging current of the battery 190 is included is identical to the reference range in which the charging current detected at the previous update period is included, the processor 120 may determine to maintain the charging stability time. Accordingly, in operation 701, the processor 120 may identify again the update period corresponding to the discharging current of the battery 190.

According to various embodiments, in operation 709, if there is change in the reference range in which the charging current of the battery 190 is included, the electronic device may update the charging stability time to correspond to the charging current of the battery 190. For example, if there is a change in the reference range in which the charging current of the battery 190 is included, the processor 120 may update the charging stability time to correspond to the changed reference range. For example, if the charging current of the battery 190 is included in any one reference range during a reference time, the processor 120 may update the charging stability time to correspond to a corresponding reference range.

Figure 8:
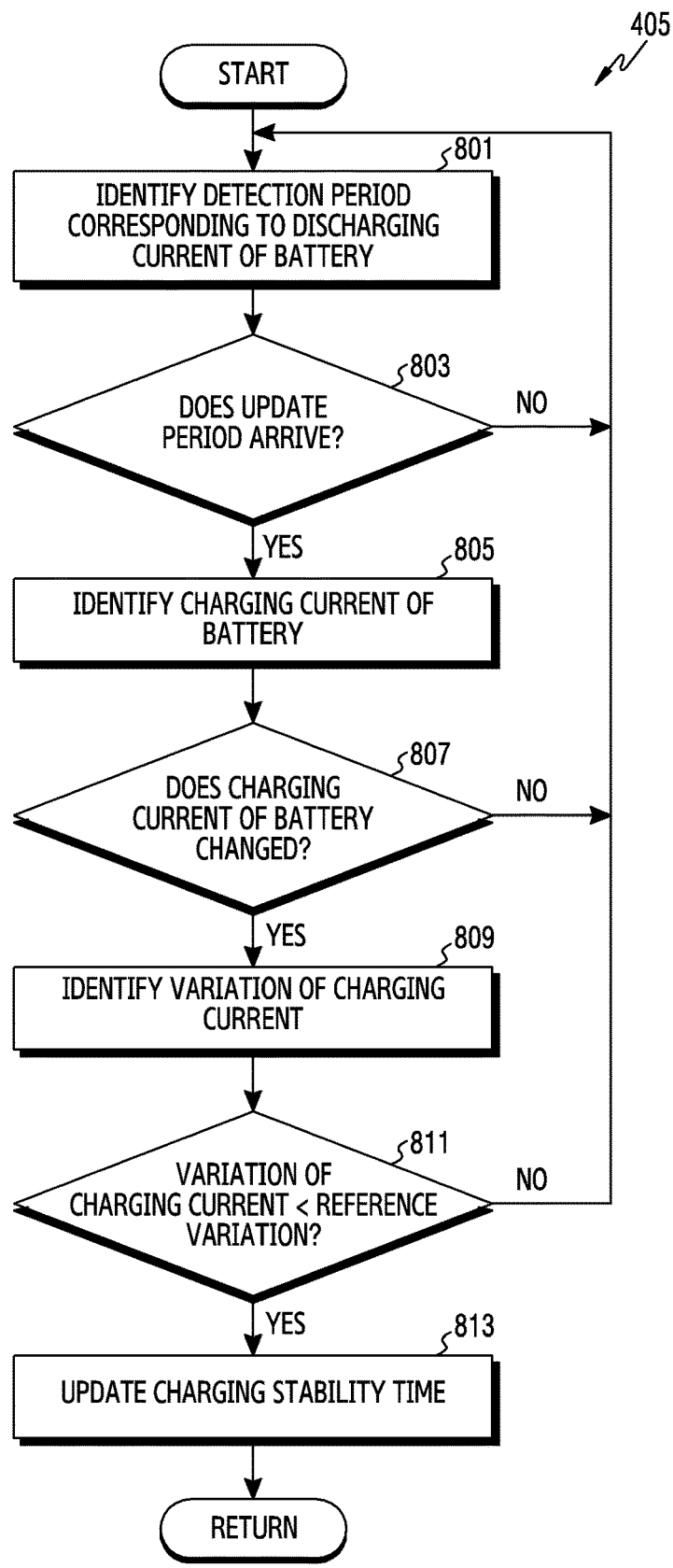
FIG. 8 illustrates another example of a flowchart for periodically identifying a change in charging current of a battery in an electronic device according to various embodiments of the disclosure.

FIG. 8 illustrates another example of a flowchart for periodically identifying a change in charging current of a battery in an electronic device according to various embodiments of the disclosure. Hereinafter, an operation of updating a charging stability time of the battery in the operation 405 of FIG. 4 will be described. Hereinafter, the electronic device may include the electronic device 101 of FIG. 1 or at least part (e.g., the processor 120) of the electronic device 101.

Referring to FIG. 8, according to various embodiments, in operation 801, if the battery 190 is charged based on power supplied from an external power device (e.g., the operation 403 of FIG. 4), the electronic device may identify an update period corresponding to discharging current of the battery 190. For example, the processor 120 may estimate the discharging current of the battery 190 based on a feature of an application executed in the electronic device 101. For instance, the feature of the application may include at least one of the number of applications being executed in the electronic device 101 and information of power (or current) required to drive each application. For example, the processor 120 may acquire authorization information required to drive the application from a profile of the application. The processor 120 may estimate power required to drive the application based on the authentication information required to drive the application. For instance, the authentication information may include information of an internal circuit (e.g., a camera module, a primary sensor, etc.) of the electronic device 101 which is accessible when the application is driven. For example, the processor 120 may estimate power required to drive the application based on an operational state of the internal circuit of the electronic device 101 corresponding to the driving of the application. According to various embodiments, the processor 120 may set an update period of a charging stability time to be relatively short with an increase in the discharging current of the battery 190. The processor 120 may set the update period of the charging stability time to be relatively long with a decrease in the discharging current of the battery 190.

According to various embodiments, in operation 803, the electronic device may identify whether the update period of the charging stability time arrives. For example, the processor 120 may identify whether the driving of a timer expires, which uses the update period of the charging stability time as a driving time.

According to various embodiments, if the update period of the charging stability time does not arrive, in operation 801, the electronic device may identify again the update period corresponding to the discharging current of the battery 190.

According to various embodiments, in operation 805, if the update period of the charging stability time arrives, the electronic device may identify the charging current of the battery 190. For example, at the arrival of the update period of the charging stability time, the processor 120 may transmit a charging current request signal of the battery 190 to the power management module 180. In response to the charging current request signal, the processor 120 may receive an amount of current used for the charging of the battery 190 from the power management module 180. For example, at the arrival of the update period of the charging stability time, the power management module 180 may transmit the amount of current used for the charging of the battery 190 to the processor 120. Accordingly, the processor 120 may identify the amount of current used for the charging of the battery 190 at a time where the update period of the charging stability time arrives.

According to various embodiments, in operation 807, the electronic device may identify whether there is a change in the charging current of the battery 190. For example, the processor 120 may identify whether the charging current of the battery 190, which is identified at the arrival of the update period of the charging stability time, is different from the charging current detected at a previous update period.

According to various embodiments, if there is no change in the charging current of the battery 190, in operation 801, the electronic device may identify again the update period corresponding to the discharging current of the battery 190. For example, if the charging current of the battery 190 is identical to the charging current detected at the previous update period, the processor 120 may determine to maintain the charging stability time. Accordingly, in operation 801, the processor 120 may identify again the update period corresponding to the discharging current.

According to various embodiments, in operation 809, if there is a change in the charging current of the battery 190, the electronic device may identify a variation of the charging current of the battery 190. For example, the processor 120 may persistently or periodically detect the charging current of the battery 190 during the update period of the charging stability time. The processor 120 may calculate the variation of the charging current, based at least in part of the charging current of the battery 190, which is detected during the update period of the charging stability time.

According to various embodiments, in operation 811, the electronic device may identify whether the variation of charging current of the battery 190 is less than a reference variation. For example, if the variation of the charging current of the battery 190 is less than the reference variation, the processor 120 may determine that the variation of the charging current of the battery 190 is small.

According to various embodiments, if the variation of the charging current of the battery 190 is greater than or equal to the reference variation, in operation 801, the electronic device may identify again the update period corresponding to the discharging current of the battery 190. For example, if the variation of the charging current of the battery is greater than or equal to the reference variation, the processor 120 may determine that the charging current of the battery is changed abruptly in an instantaneous manner. The processor 120 may limit the update of the charging stability time upon detection of an instantaneous change of the charging current of the battery to prevent a frequent change in the charging stability time.

According to various embodiments, in operation 813, if the variation of the charging current of the battery 190 is less than the reference variation, the electronic device may update the charging stability time to correspond to the charging current of the battery 190. For example, the processor 120 may update the charging stability time based on the charging current of the battery 190.

Figure 9:
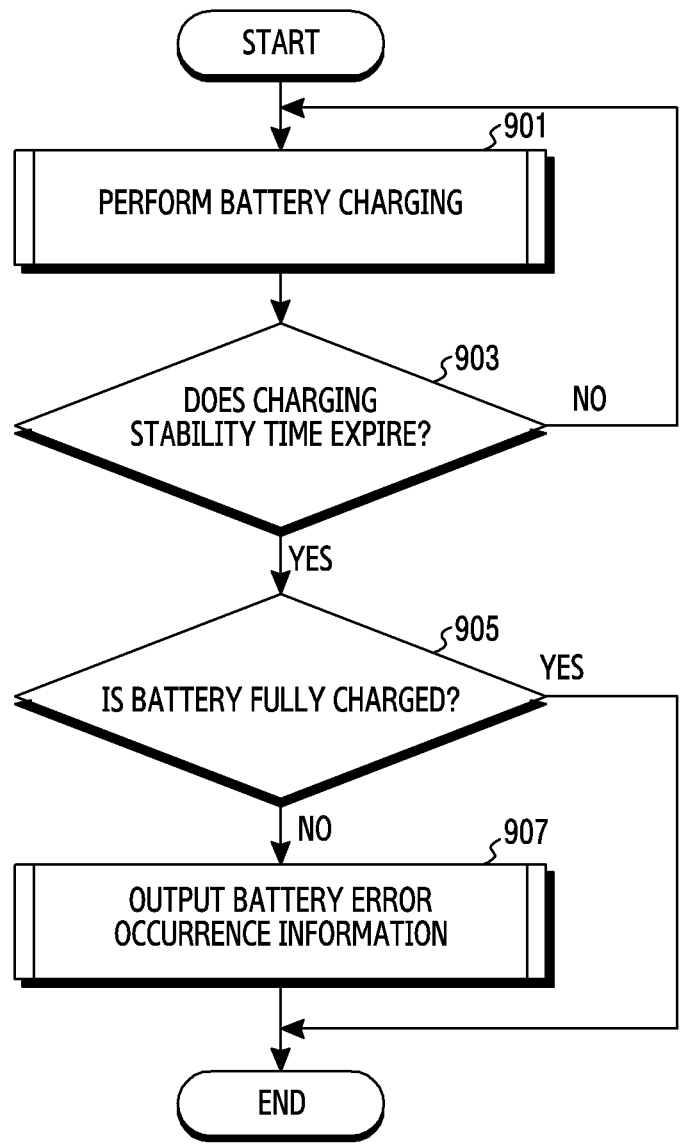
FIG. 9 is a flowchart for outputting error occurrence information of a battery in an electronic device according to various embodiments of the disclosure.

FIG. 9 is a flowchart for outputting error occurrence information of a battery in an electronic device according to various embodiments of the disclosure. Hereinafter, the electronic device may include the electronic device 101 of FIG. 1 or at least part (e.g., the processor 120) of the electronic device 101.

Referring to FIG. 9, according to various embodiments, in operation 901, the electronic device may charge the battery 190 of the electronic device based on power supplied from an external power device. For example, the processor 120 may charge the battery 190 by using at least part of power supplied from the external power device coupled to the electronic device 101 as in the operations 401 to 405 of FIG. 4. For example, the processor 120 may set a charging stability time based on a time required to fully charge the battery 190 by using the external power device and an error history of the battery 190 by using the external power device. For example, the processor 120 may update the charging stability time based on a change in at least one of charging current and discharging current of the battery 190.

According to various embodiments, in operation 903, the electronic device may identify whether the charging stability time expires. For example, if the charging stability time corresponding to the external electronic device is set or changed, the processor 120 may drive a timer which uses the charging stability time as a driving time. The processor 120 may identify whether the driving time of the timer expires.

According to various embodiments, if the charging stability time does not expire, in operation 901, the electronic device may persistently charge the battery 190. For example, the processor 120 may update the charging stability time based on a change in at least one of the charging current and the discharging current while charging the battery 190.

According to various embodiments, in operation 905, if the charging stability time expires, the electronic device may identify whether the battery 190 is fully charged. For example, the processor 120 may use the power management module 180 to identify whether the battery 190 is fully charged.

According to various embodiments, in operation 907, if the battery 190 is not fully charged at a time where the charging stability time expires, the electronic device may output battery error occurrence information. For example, if the battery is not fully charged at the time where the charging stability time expires, the processor 120 may determine that an error occurs in the battery 190. Accordingly, the processor 120 may control the display 160 to display a message for guiding the battery 190 to be checked. For example, if the battery is not fully charged at the time where the charging stability time expires, the processor 120 may control the power management module 180 to temporarily cut off the charging of the battery 190. For instance, if the charging of the battery 190 is temporarily cut off, the processor 120 may cancel the cutting off of the charging of the battery 190 based on a disconnection with the external power device. For example, if the battery is not fully charged at the time where the charging stability time expires, the processor 120 may control the power management module 180 to cut off the charging of the battery 190 based on an error occurrence count of the battery 190. For instance, if the charging of the battery 190 is cut off, the power management module 180 may persistently cut off the charging of the battery 190 even if the external power device is reconnected or another external power device is connected.

According to an embodiment, if the battery 190 is fully charged at the time where the charging stability time expires, the electronic device may determine that the battery operates normally.

Figure 10:
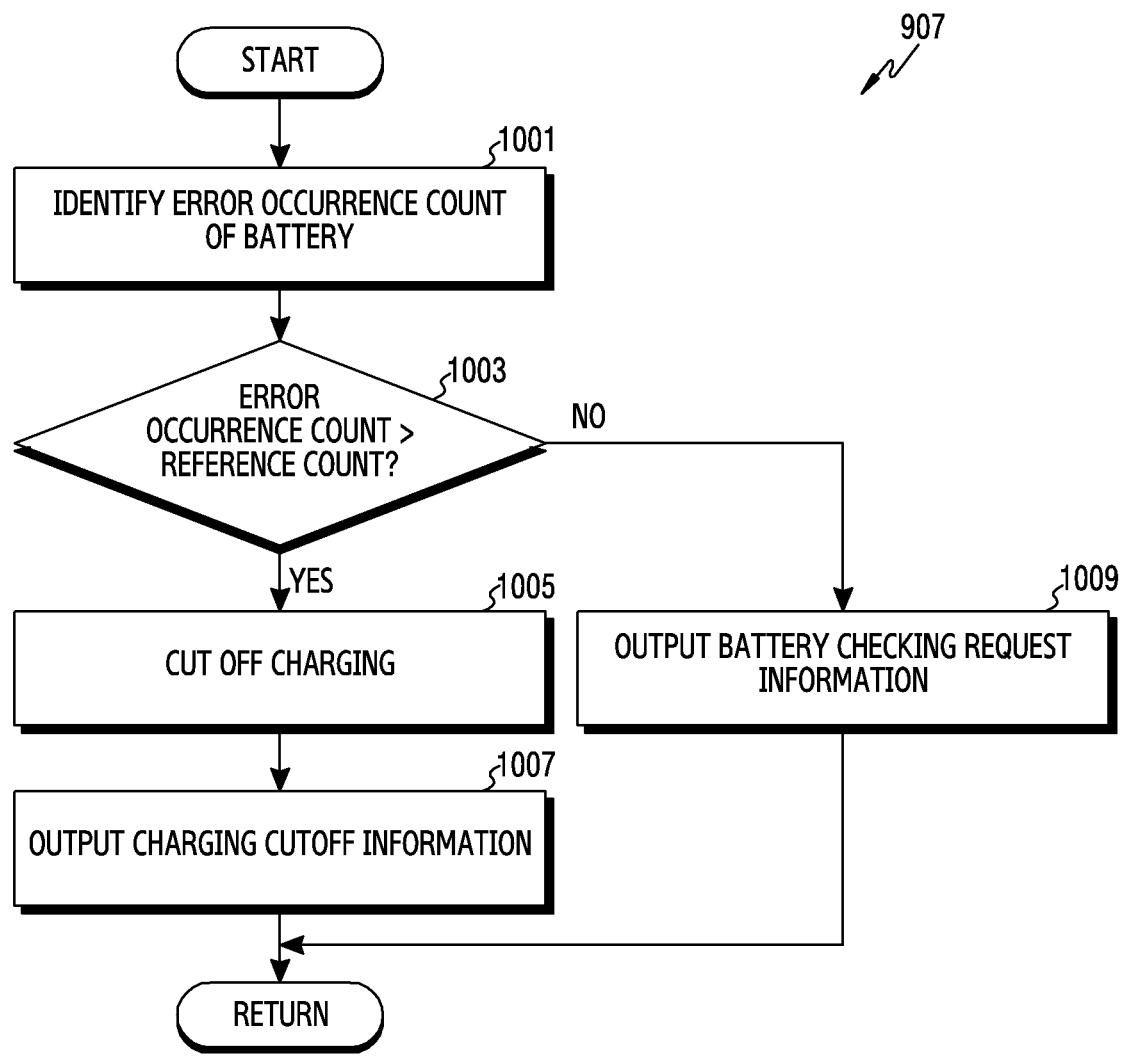
FIG. 10 is a flowchart for cutting off charging of a battery in an electronic device according to various embodiments of the disclosure.

FIG. 10 is a flowchart for cutting off charging of a battery in an electronic device according to various embodiments of the disclosure. The following description is about an operation for outputting battery error occurrence information in the operation 907 of FIG. 9. Hereinafter, the electronic device may include the electronic device 101 of FIG. 1 or at least part (e.g., the processor 120) of the electronic device 101.

Referring to FIG. 10, according to various embodiments, in operation 1001, if the battery 190 is not fully charged at a time where a charging stability time expires (e.g., the operation 905 of FIG. 9), the electronic device may identify an error occurrence count of the battery 190. For example, the processor 120 may identify the error occurrence count of the battery 190, stored in the memory 130. For instance, an error of the battery 190 may include at least one of leakage current generation of the electronic device 101, compulsory charging cutoff, and information of a state where the battery 190 is not fully charged at the time where the charging stability time expires.

According to various embodiments, in operation 1003, the electronic device may identify whether the error occurrence count of the battery 190 exceeds a reference count. For example, the reference count may include a value which is set to determine whether the charging of the battery 190 is cut off in the processor 120.

According to various embodiments, in operation 1005, if the error occurrence count of the battery 190 exceeds the reference count, the electronic device may cut off the charging of the battery 190. For example, if the error occurrence count of the battery 190 exceeds the reference count, the processor 120 may determine that a user of the electronic device 101 may experience an additional damage (e.g., explosion) due to the error of the battery 190. The processor 120 may control the power management module 180 to cut off current supplied from the battery 190. In this case, the power management module 180 may persistently cut off the current supplied from the battery 190 even if the external power device is newly connected.

According to various embodiments, in operation 1007, the electronic device may output charging cutoff information of the battery 190. For example, upon cutting off the charging of the battery 190, the processor 120 may provide control to output the charging cutoff information of the battery 190 in at least one of message, image, sound, and indicator forms. For example, the processor 120 may control the display 160 to display the charging cutoff information of the battery 190 and checking request information of the battery 190.

According to various embodiments, in operation 1009, if the error occurrence count of the battery 190 is less than or equal to a reference count, the electronic device may output battery checking request information. For example, the processor 120 may provide control to output the checking request information of the battery 190 in at least one of message, image, sound, and indicator forms. For example, the processor 120 may control the input/output interface 150 (e.g., an audio processing module) to output a warning sound corresponding to the error occurrence information of the battery 190. For example, if the error occurrence count of the battery 190 is less than or equal to the reference count, the processor 120 may control the power management module 180 to temporarily cut off the current supplied from the battery 190. In this case, upon disconnection with the external power device, the power management module 180 may activate the current supplied from the battery 190.

According to various embodiments of the disclosure, a method of operating an electronic device may include setting a charging stability time corresponding to an external device upon connection with the external power device, charging the battery, based at least in part on power of the external power device, and updating the charging stability time, based on a change of at least one of charging current and discharging current of the battery.

According to various embodiments, the setting of the charging stability time may include setting the charging stability time corresponding to the external power device based on an error history of the battery and a time required to fully charge the battery.

According to various embodiments, the updating of the charging stability time may include determining an update period based on the discharging current of the battery, identifying the charging current of the battery at the arrival of the update period, and updating the charging stability time based on the charging current of the battery.

According to various embodiments, the discharging current of the battery may be determined based on current consumed in an internal circuit of the electronic device.

According to various embodiments, the updating of the charging stability time may include identifying a reference range in which the charging current of the battery is included, and updating the charging stability time based on the reference range if there is a change in the reference range in which the charging current of the battery is included.

According to various embodiments, the updating of the charging stability time may include identifying a variation of the charging current of the battery if there is a change in the charging current of the battery, determining whether to update the charging stability time based on the variation of the charging current of the battery, and updating the charging stability time based on the charging current of the battery upon determining to update the charging stability time.

According to various embodiments, the variation of the charging current of the battery may be determined based on the battery's charging current detected during the update period.

According to various embodiments, the method may further include identifying the charging state of the battery at the expiry of the charging stability time, and storing error occurrence information of the battery if the battery is not fully charged.

According to various embodiments, the method may further include identifying the charging state of the battery at the expiry of the charging stability time, and outputting error occurrence information of the battery if the battery is not fully charged.

According to various embodiments, the method may further include identifying the charging state of the battery at the expiry of the charging stability time, identifying an error occurrence count of the battery if the battery is not fully charged, and cutting off the charging of the battery based on the error occurrence count of the battery.

An electronic device and an operating method thereof according to various embodiments can adaptively control a charging stability time based on at least one of heat generation, charging efficiency, charging/discharging current, a system status, and a battery error occurrence history, thereby reducing user inconvenience which occurs when charging is unnecessarily cut off.

At least part of a device (e.g., modules or functions thereof) or method (e.g., operations) according to various embodiments may be implemented with a command (or an instruction stored in a computer-readable storage media (e.g., the memory). If the instruction is executed by one or more processors (e.g., the processor 120), the one or more processors may perform a function corresponding to the instruction. The computer-readable storage media may include a hard disk, a floppy disk, magnetic media (e.g., a magnetic tape), optical media (e.g., a Compact Disc-ROM (CD-ROM), a Digital Versatile Disc (DVD), magnetic-optic media (e.g., a floptical disk)), an internal memory, or the like. The instruction may include a code created by a compiler or a code executable by an interpreter. The module or programming module according to various embodiments may further include at least one or more components among the aforementioned components, or may omit some of them, or may further include additional other components.

Operations performed by a module, a program module, or other components according to various embodiments can be executed in a sequential, parallel, repetitive, or heuristic manner. In addition, some operations can be executed in a different order or be omitted, or other operations can be added.

In addition, various embodiments included in the disclosure are provided for explaining and understanding technical features, not for limiting the scope of the disclosure. Therefore, all changes based on the technical features of the disclosure or various other embodiments will be construed as being included in the scope of the disclosure.

What is claimed is:

1. An electronic device comprising:
a battery;
at least one processor; and
a memory electrically coupled to the at least one processor,
wherein the memory stores instructions, that are executable by the at least one processor to cause the electronic device to:
acquire power-related information from an external power device corresponding to the external power device upon connection with the external power device;
set a charging stability time based on the power-related information, wherein the charging stability time indicates a time period to complete charging the battery without overcharging;
charge the battery, based on the charging stability time; and
update the charging stability time, based on a change of at least one of charging current and discharging current of the battery and an error history of the battery,
wherein the power-related information includes at least one of a type of the external power device or charging current to be input to the electronic device,
wherein the error history of the battery includes at least one of leakage current generation information, charging cutoff information, or information of a state where the battery is not fully charged at a time where the charging stability time expires.

2. The electronic device of claim 1, wherein the instructions allow the at least one processor to:
determine an update period based on the discharging current of the battery;
identify the charging current of the battery at arrival of the update period; and
update the charging stability time based on the charging current of the battery.

3. The electronic device of claim 2, wherein the instructions allow the at least one processor to detect the discharging current of the battery based on current consumed in an internal circuit of the electronic device.

4. The electronic device of claim 2, wherein the instructions allow the at least one processor to:
identify a reference range in which the charging current of the battery is included; and
update the charging stability time based on the reference range if there is a change in the reference range in which the charging current of the battery is included.

5. The electronic device of claim 2, wherein the instructions allow the at least one processor to:
identify a variation of the charging current of the battery if there is a change in the charging current of the battery;
determine whether to update the charging stability time based on the variation of the charging current of the battery; and
update the charging stability time based on the charging current of the battery upon determining to update the charging stability time.

6. The electronic device of claim 5, wherein the instructions allow the at least one processor to:
detect the charging current of the battery during the update period; and
detect the variation of the charging current of the battery based on the charging current of the battery detected during the update period.

7. The electronic device of claim 1, wherein the instructions allow the at least one processor to:
identify a charging state of the battery at expiry of the charging stability time; and
control the memory to store error occurrence information of the battery if the battery is not fully charged.

8. The electronic device of claim 1, further comprising a display,
wherein the instructions allow the at least one processor to:
identify a charging state of the battery at expiry of the charging stability time; and
control the display to output error occurrence information of the battery if the battery is not fully charged.

9. The electronic device of claim 1, wherein the instructions allow the at least one processor to:
identify a charging state of the battery at expiry of the charging stability time;
identify an error occurrence count of the battery if the battery is fully charged; and
cut off the charging of the battery based on the error occurrence count of the battery.

10. A method of operating an electronic device, the method comprising:
acquiring power-related information from an external device corresponding to an external power device upon connection with the external power device;
setting, by at least one processor, a charging stability time based on the power-related information, wherein the charging stability time indicates at time of period to complete charging a battery without overcharging;
charging the battery, based on the charging stability time; and
updating the charging stability time, based on a change of at least one of charging current and discharging current of the battery and an error history of the battery,
wherein the power-related information includes at least one of a type of the external power device or charging current to be input to the electronic device,
wherein the error history of the battery includes at least one of leakage current generation information, charging cutoff information, or information of a state where the battery is not fully charged at a time where the charging stability time expires.

11. The method of claim 10, wherein the updating of the charging stability time includes:
determining an update period based on the discharging current of the battery;
identifying the charging current of the battery at arrival of the update period; and
updating the charging stability time based on the charging current of the battery.

12. The method of claim 11, wherein the updating of the charging stability time includes:
identifying a reference range in which the charging current of the battery is included; and updating the charging stability time based on the reference range if there is a change in the reference range in which the charging current of the battery is included.

13. The method of claim 11, wherein the updating of the charging stability time includes:
   identifying a variation of the charging current of the battery if there is a change in the charging current of the battery;
   determining whether to update the charging stability time based on the variation of the charging current of the battery; and
   updating the charging stability time based on the charging current of the battery upon determining to update the charging stability time.

* * * * *